(12) United States Patent
Oakley

(10) Patent No.: US 9,581,677 B2
(45) Date of Patent: Feb. 28, 2017

(54) DIRECTION OF ARRIVAL DETERMINATION FOR A RADIO SIGNAL

(71) Applicant: Peter Q. Oakley, Langley, WA (US)

(72) Inventor: Peter Q. Oakley, Langley, WA (US)

(73) Assignee: Fluke Corporation, Everett, WA (US)

( * ) Notice: Subject to any disclaimer, the term of this patent is extended or adjusted under 35 U.S.C. 154(b) by 643 days.

(21) Appl. No.: 13/974,327

(22) Filed: Aug. 23, 2013

(65) Prior Publication Data

US 2015/0054689 A1 Feb. 26, 2015

(51) Int. Cl.
| | |
|---|---|
| *G01S 3/04* | (2006.01) |
| *G01S 3/22* | (2006.01) |
| *H01Q 11/08* | (2006.01) |
| *H01Q 21/08* | (2006.01) |
| *H01P 5/22* | (2006.01) |

(52) U.S. Cl.
CPC ............... *G01S 3/043* (2013.01); *G01S 3/22* (2013.01); *H01P 5/227* (2013.01); *H01Q 11/08* (2013.01); *H01Q 21/08* (2013.01)

(58) Field of Classification Search
CPC ........................................................ G01S 3/043
USPC ............................................................. 342/417
See application file for complete search history.

(56) References Cited

U.S. PATENT DOCUMENTS

| | | | |
|---|---|---|---|
| 3,761,927 A | | 9/1973 | Amoroso, Jr. |
| 3,824,595 A | * | 7/1974 | Hall ........................ G01S 1/02 342/384 |
| 4,638,319 A | * | 1/1987 | Chua ........................ G01S 3/48 342/147 |
| 7,609,205 B2 | | 10/2009 | Haskell |
| 2007/0103253 A1 | | 5/2007 | Napijalo |
| 2011/0304508 A1 | | 12/2011 | Remez et al. |

FOREIGN PATENT DOCUMENTS

| | | |
|---|---|---|
| DE | 3525778 A1 | 3/1986 |
| WO | WO-0127650 A1 | 4/2001 |

OTHER PUBLICATIONS

Yang N et al: "Monopulse comparator with frequency-independent delta-channel nulls for high-resolution tracking radar", Electronic Letters, The Institution of Engineering and Technology, vol. 47, No. 5, Mar. 3, 2011 (Mar. 3, 2011), pp. 339-340, XP006038265, ISSN: 1350-911X, DOI: 10.1049/EL:20103523.
European Search Report dated Mar. 6, 2015 for European Patent Application No. 14182046.4.

* cited by examiner

*Primary Examiner* — Gregory C Issing
*Assistant Examiner* — Helena Seraydaryan
(74) *Attorney, Agent, or Firm* — Locke Lord LLP; Scott D. Wofsy; Christopher J. Capelli

(57) ABSTRACT

At least two input signals, each characterizing a radio signal having a radio frequency (RF), are received. The input signals are converted into at least three output signals. The output signals have a unique combination of corresponding magnitudes for each RF phase difference between the input signals. A set of magnitudes corresponding to the output signals is measured using a mobile measuring device. An RF phase angle value is determined based the measured set of magnitudes. The RF phase angle value is converted into an angle value indicative of the direction of arrival of the radio signal.

15 Claims, 12 Drawing Sheets

DIRECTION OF ARRIVAL DETERMINATION FOR A RADIO SIGNAL

FIELD OF THE INVENTION

The disclosed embodiments generally relate to monopulse systems, and more particularly, to monopulse systems capable of determining the physical location of a source of a radio signal.

BACKGROUND OF THE INVENTION

One known method to build a radio signal direction-finding system includes creating a single antenna with a narrow beamwidth. When the signal received by the antenna is relatively strong, then the radio source is known to be in the direction the antenna's beam is pointed to. A narrow beam is necessary to obtain the source's direction with good angular resolution. It is noted that an antenna's beamwidth is inversely related to its size. An antenna with a sufficiently narrow beam tends to be inconveniently large.

Another known method of determining the direction of arrival of a radio signal is a sequential lobing technique. In the sequential lobing technique, an antenna system is deployed which has two beams (also known as lobes) pointing in two different but nearby directions. This technique typically involves activation of the two beams alternately and sequentially on sequential radio transmissions or radar pulses. The signal strengths from the two beams can be compared to each other. In the sequential lobing technique, the source of the radio signal is deduced to be in the direction of the stronger beam and the ratio of the strengths indicates the degree the radio signal is directed toward the stronger beam. The sequential lobing technique does not require especially narrow beam widths and thus the antenna(s) can be relatively small.

However, transmitter instability, changing multipath and other variations can cause the received signal strength to change from the activation of one beam to the other for reasons unrelated to direction of arrival. A radio signal direction-finding system based on the sequential lobing technique may misinterpret these changes as the direction of arrival indication.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method and system for determining the direction of arrival of a radio signal is described in which at least two input signals characterizing a radio signal having a radio frequency (RF) are received. The input signals are converted into at least three output signals. The output signals have a unique combination of corresponding magnitudes for each RF phase difference between the input signals. A set of magnitudes corresponding to the output signals is measured. An RF phase angle value is determined based on the measured set of magnitudes. The RF phase angle value is converted into an angle value indicative of the direction of arrival of the radio signal.

In another aspect, a computer program product for determining the direction of arrival of a radio signal is provided. The computer program product comprises one or more computer-readable storage devices and a plurality of program instructions stored on at least one of the one or more computer-readable storage devices. The plurality of program instructions comprises program instructions to receive at least two input signals each characterizing the radio signal having a radio frequency (RF). The plurality of program instructions further comprises program instructions to convert the at least two input signals into at least three output signals. The at least three output signals have a unique combination of corresponding magnitudes for each RF phase difference between the at least two input signals. The plurality of program instructions further comprises program instructions to measure a set of magnitudes corresponding to the at least three output signals. The plurality of program instructions further comprises program instructions to determine an RF phase angle value based on the measured set of magnitudes. The plurality of program instructions further comprises program instructions to convert the RF phase angle value into an angle value indicative of the direction of arrival of the radio signal.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
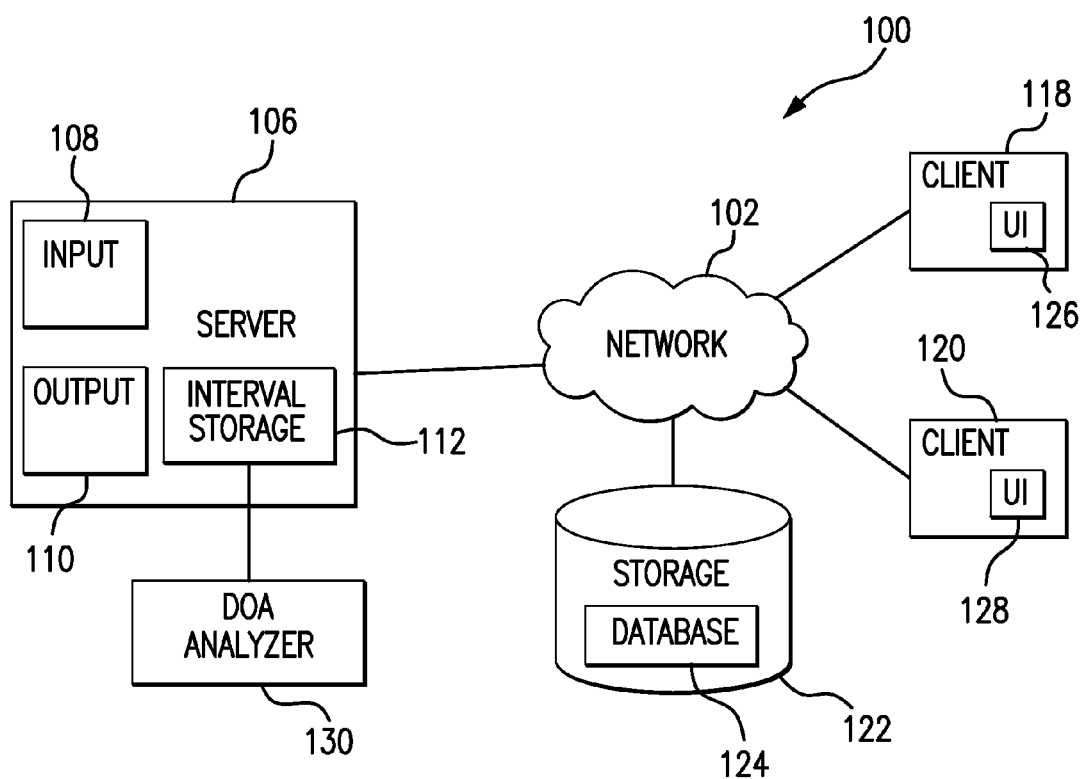
FIG. 1 illustrates the components of an exemplary computer environment in which an illustrative embodiment of the present invention may be implemented.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

As to be described further below with reference to FIGS. 1-11, an illustrated embodiment of the present invention in one aspect generally relates to a system for determining the physical location of a source of a radio signal using a monopulse technique. The monopulse technique addresses the weakness of the sequential lobing technique described above by determining the DOA data from a single radio transmission or radar pulse. According to an embodiment of the present invention, the system illustrated in FIG. 6 measures the phase difference between signals received by at least two separated antennas and converts this difference into a unique combination of magnitudes for each possible radio frequency (RF) phase angle difference between the two received signals. The system further includes the DOA analyzer program (shown in FIG. 1) for performing DOA determination based on the unique combination of magnitude measurements.

With reference now to FIG. 1, an exemplary computer environment is illustrated in which an illustrative embodiment of the present invention may be implemented. It should be appreciated that FIG. 1 is only provided as an illustration of one implementation and is not intended to imply any limitation with regard to the environments in which different embodiments may be implemented. Many modifications to the depicted environments may be made.

Computer system 100 is a network of computers. In the depicted example, computer system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, computer system 100 also may be implemented as a number of different types of networks, such as an intranet, a local area network (LAN), or a wide area network (WAN). Network 102 is the medium used to provide communications links between various devices and computers connected together within computer system 100. Network 102 may include connections, such as wire, wireless communication links, or fiber optic cables.

Client computers 118 and 120 connect to network 102. Client computers 118 and 120 may be, for example, mobile devices, telephones, television receivers, cell phones, personal digital assistants, netbooks, laptop computers, tablet computers, desktop computers, and/or any type of computing devices capable of rendering DOA determination results to a user via, for example user interfaces (UIs) 126 and 128. UIs 126 and 128 can be, for example, graphical user interfaces (GUIs) or web user interfaces (WUIs).

Server computer 106 and storage unit 122 also connect to network 102. Computer system 100 may include additional server computers, client computers, displays and other devices not shown. Client computers 118 and 120 are clients to server computer 106 in this example. Server computer 106 may contain an input device 108 and an output device 110.

DOA analyzer program 130, located in computer system 100, may comprise program instructions stored on one or more computer-readable storage devices, which may include internal storage 112 on server computer 106. DOA analyzer program 130 may be, for example, a computer program or program component for determining the physical location of a source of a received radio signal as discussed further below in conjunction with FIG. 9B. Data gathered, generated, and maintained for use by DOA analyzer program 130 may be kept in internal storage 112 of server computer 106 or in one or more databases 124 of storage unit 122.

Figure 2:
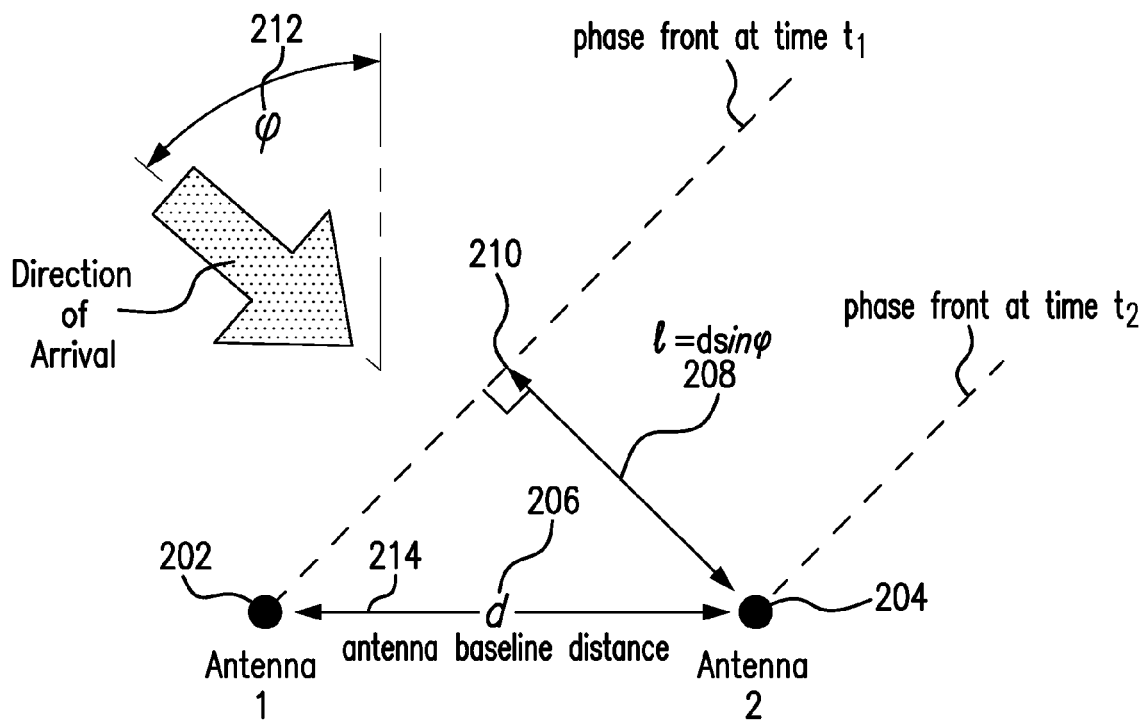
FIG. 2 illustrates geometrical relations used in determining the direction of arrival (DOA) of a radio signal in accordance with an illustrated embodiment of the present invention.

With reference now to FIG. 2, shown are geometrical relations used in determining the DOA of a radio signal in accordance with an illustrated embodiment of the present invention. Pair of antennas 202, 204 is separated by a distance "d" 206 so that a wave incident at an angle φ 212 to the antennas 202, 204 will provide a phase difference in the electrical signals generated within the antennas 202, 204. The angular direction of arrival of the radio signal may be obtained by measuring angle φ 212 relative to the perpendicular to a baseline 214. For purposes of illustration it is assumed that a source of the received radio signal is distant enough so that the corresponding radio wave can be modeled as approximating a plane wave. Further, it is assumed that a particular phase front 210 of the plane wave arrives at first antenna 202 at time $t_1$. Due to the finite propagation speed, phase front 210 arrives at second antenna 204 at a later time $t_2$. As known in the art, the time interval $\Delta t$ between $t_1$ and $t_2$ can be converted to an equivalent RF phase difference α measured between the signals received by the antennas 202, 204.

With reference back to FIG. 2, the distance l 208 the phase front 210 travels in the time interval $\Delta t$ is represented by the following formula:

$$l = d \sin \phi \tag{1}$$

The time interval $\Delta t$ is the distance l 208 traveled divided by the velocity:

$$\Delta t = \frac{l}{c} \tag{2}$$

where c is the speed of light. The time interval $\Delta t$ can also be related to the RF phase angle difference α (in radians) measured between the two antennas 202, 204 by the following formula:

$$\Delta t = \frac{\alpha}{2\pi f} \quad (3)$$

where f is the RF frequency measured in hertz. Combining formulas (1), (2) and (3) and solving for the direction of arrival yields:

$$\varphi = \sin^{-1}\left(\frac{\alpha c}{d 2\pi f}\right) \quad (4)$$

An illustrative embodiment of the present invention utilizes the fact that a measurement of the RF phase angle difference α can be directly converted into a measurement indicative of the direction of arrival ϕ 212 of the received radio signal wave.

Figure 6:
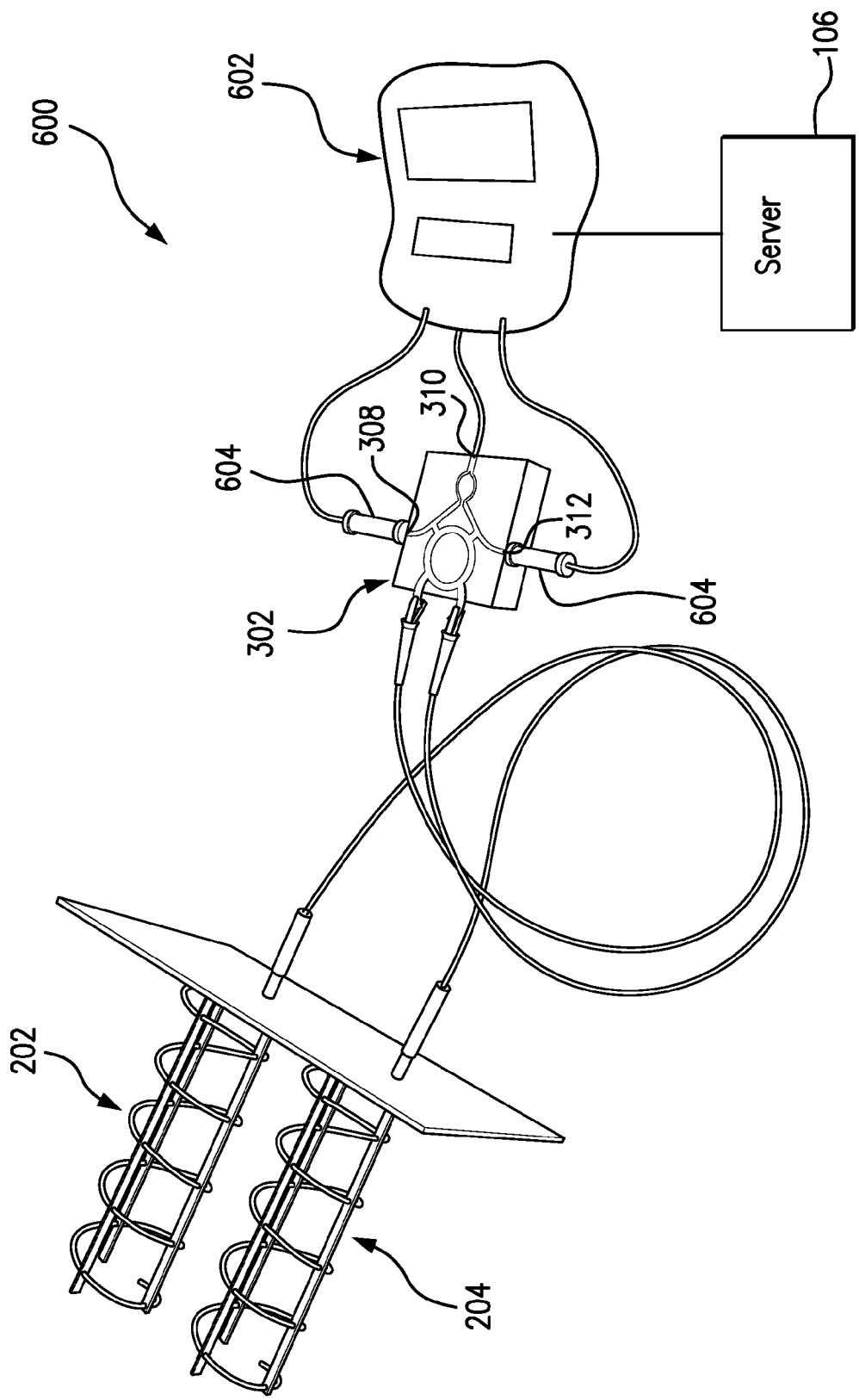
FIG. 6 illustrates a detailed diagram of a system, which may be used for determining the DOA of the radio signal in accordance with an illustrated embodiment of the present invention.

FIG. 6 illustrates a detailed diagram of a system, which may be used for determining the DOA of the radio signal in accordance with an illustrated embodiment of the present invention.

As shown in FIG. 6, a DOA determination system 600 may include pair of antennas 202, 204, a phase angle measurement circuit 302, a mobile measuring device 602 and the server computer 106 of FIG. 1. For simplicity of illustration and discussion only the server computer 106 of the computer system of FIG. 1 is depicted in FIG. 6. Various components of the DOA determination system 600 will be further discussed below.

Figure 3:
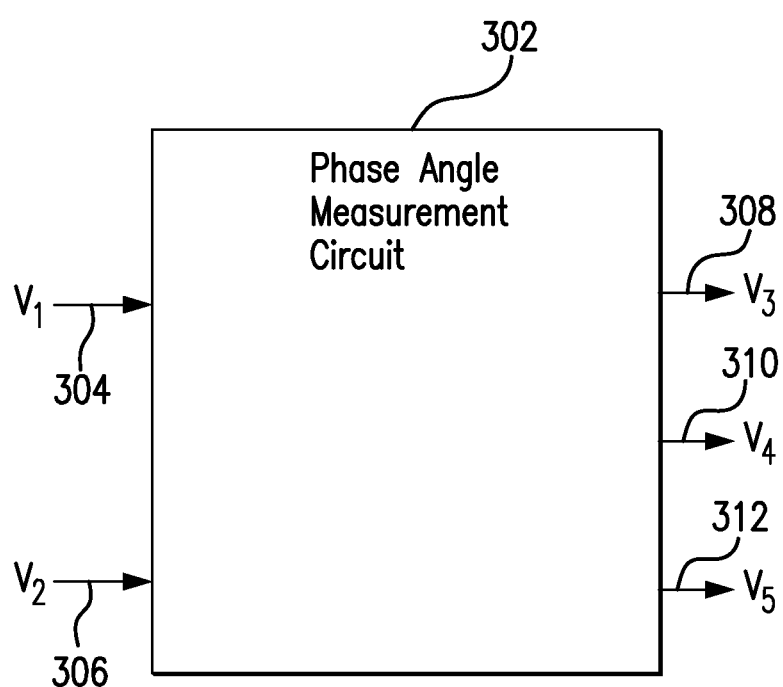
FIG. 3 depicts a high level block diagram of a phase angle measurement circuit in accordance with an illustrated embodiment.

With reference now to FIG. 3, a high level block diagram of the phase angle measurement circuit 302 of FIG. 6 is shown. In accordance with an illustrated embodiment, the phase angle measurement circuit 302 takes two signals representing a radio signal received by the pair of antennas 202, 204 as input. The phase angle measurement circuit 302 produces a set of three outputs. Advantageously, the produced set contains a unique combination of magnitudes for each possible RF phase angle difference between the two input signals.

In response to receiving a radio signal, the antennas 202 and 204 produce RF carrier voltages $V_1$ and $V_2$ referred to herein after as a first input signal ($V_1$) 304 and second input signal ($V_2$) 306. When these two input signals 304, 306 are applied as an input to the phase angle measurement circuit 302, the circuit 302 is configured to produce three output signals, such as, for example, first output signal ($V_3$) 308, second output signal ($V_4$) 309, and third output signal ($V_5$) 310. The output signals 308, 309 and 310 have individual magnitudes and phases. However, the DOA determination system 600 is concerned only with the magnitude component of output signals 308, 309 and 310.

Figure 4:
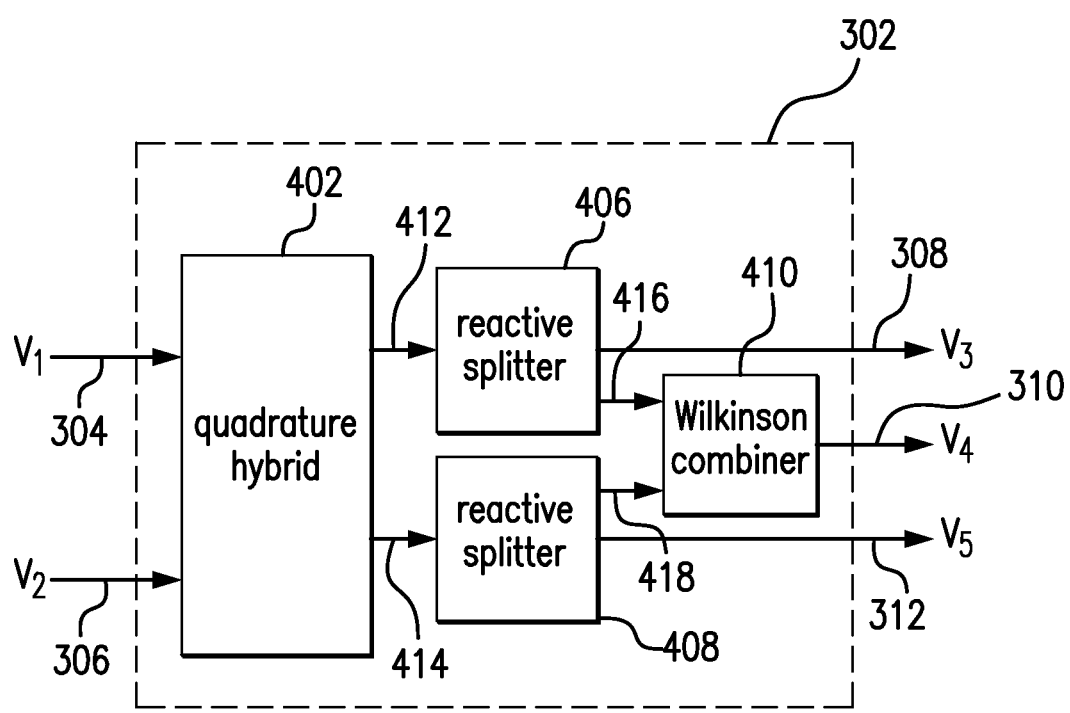
FIG. 4 depicts a detailed block diagram of the phase angle measurement circuit of FIG. 3.

With reference now to FIG. 4, a detailed block diagram of the phase angle measurement circuit 302 of FIG. 3 is shown in accordance with an illustrative embodiment of the present invention. In one illustrative circuit arrangement, the phase angle measurement circuit 302 may include a phase shifting circuit component, a power splitting circuit component and a power combining circuit component.

In one embodiment of the present invention the phase shifting circuit component may include a quadrature hybrid 402. The quadrature hybrid 402 is a device which accepts two inputs, delivers up to two outputs, adjusts power levels from the inputs to the outputs in various ways, and potentially changes phase of one or both outputs. According to one embodiment of the present invention, a first output signal 412 of the quadrature hybrid 402 may represent a sum of the first input signal 304 phase shifted by 90 degrees and the second input signal 306 phase shifted by 180 degrees. A second output signal 414 of the quadrature hybrid 402 may represent a sum of the first input signal 304 phase shifted by 180 degrees and the second input signal 306 phase shifted by 90 degrees.

In one embodiment of the present invention the power splitting circuit component may include a pair of splitters 406 and 408. Each of the splitters 406 and 408 may be configured for separating each of the first 412 and second 414 output signals. First splitter 406 produces a first pair of output signals 416 and 308 that are duplicates of the first output signal 412 of the phase shifting circuit 402. Similarly, second splitter 408 produces a second pair of output signals 418 and 312 that are duplicates of the second output signal 414 of the phase shifting circuit 402. In one embodiment of the present invention, the first 406 and second 408 splitters may comprise reactive splitters consisting of a pair of quarter wavelength (λ/4) transmission line sections with characteristic impedance of approximately 70.7 ohms. In another embodiment, the first 406 and second 408 splitters may be implemented as Wilkinson type splitters.

In one embodiment of the present invention a power combining circuit may include a Wilkinson-type power combiner 410. The Wilkinson combiner 410 receives one of the first pair of output signals 416 of the first splitter 406 and one of the second pair of output signals 418 of the second splitter 408. The Wilkinson combiner 410 generates an output signal 310 comprising a sum of the received input signals 416 and 418. At least in some embodiments, the Wilkinson-type power combiner 410 may include a resistor since input signals 416 and 418 may differ and since a differential signal may be present in the power combining circuit.

Thus, in accordance with an illustrated embodiment, the phase angle measurement circuit 302 takes two input signals 304 and 306 representing a radio signal received by the pair of antennas 202, 204. The phase angle measurement circuit 302 produces a set of three output signals 308, 310, 312. First output signal 308 of the phase angle measurement circuit 302 comprises one of the output signals of the first splitter 406. Third output signal 312 of the phase angle measurement circuit 302 comprises one of the output signals of the second splitter 408. Second output signal 310 of the phase angle measurement circuit 302 comprises a previously described output from the Wilkinson-type power combiner 410. Advantageously, the produced set of output signals 308, 310, 312 comprises a unique combination of magnitudes for each possible RF phase angle difference between the two input signals 304 and 306.

Figure 5:
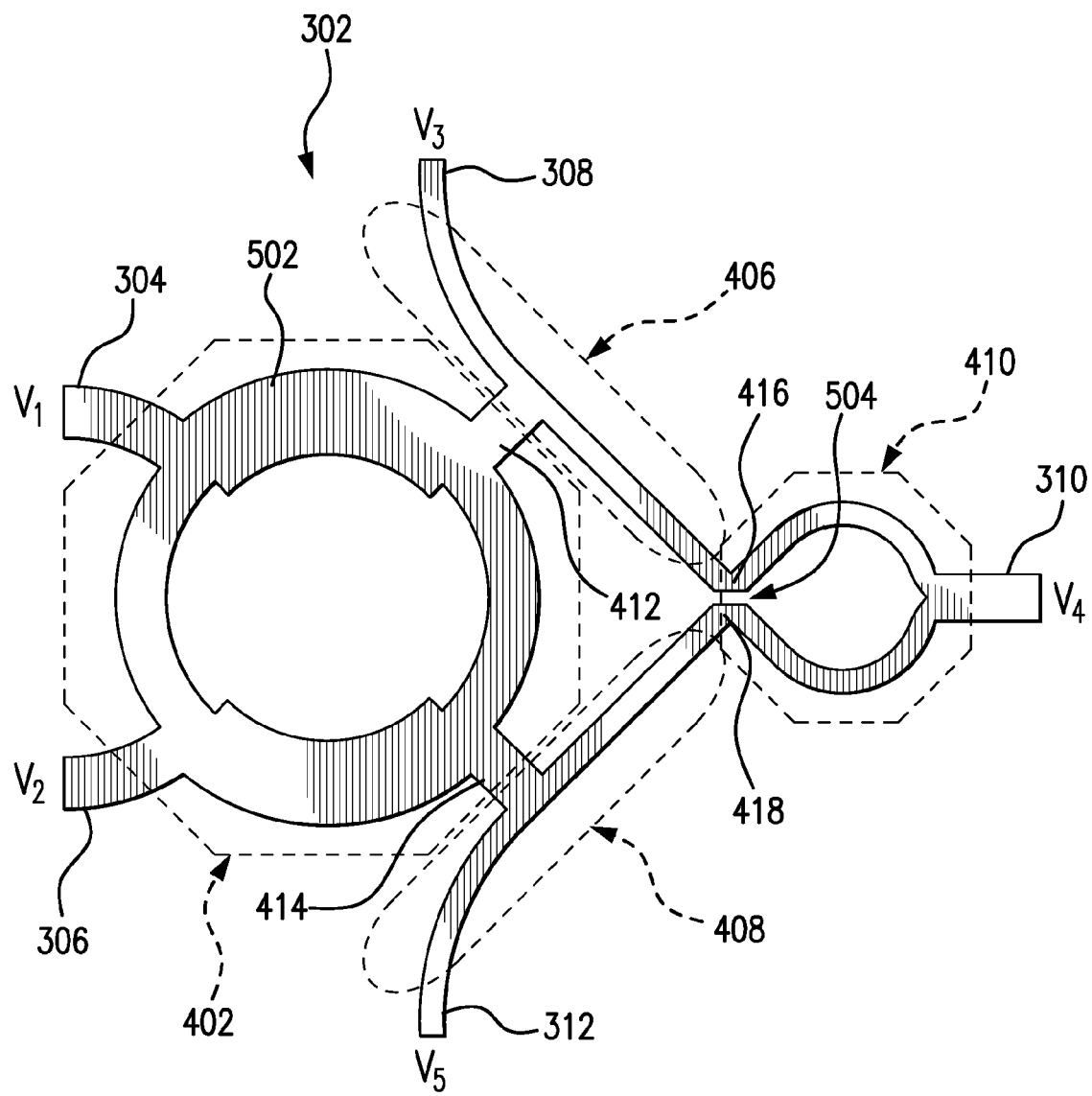
FIG. 5 depicts an exemplary physical layout arrangement of the phase angle measurement circuitry of FIG. 3.

With reference now to FIG. 5, an exemplary physical layout arrangement of the phase angle measurement circuitry of FIG. 3 is shown. In one illustrative embodiment the phase angle measurement circuit 302 may be implemented using microstrip transmission lines. In other embodiments different types of transmission media may be used, such as, for example, but not limited to, waveguides, coplanar transmission lines and coaxial cables. In the illustrated embodiment, each microstrip transmission line may include a ground conductor that forms a ground plane and at least one signal line. In general, transmission lines may include any suitable number of signal conductors. In the embodiment illustrated in FIG. 5, three different types of microstrip transmission lines are used.

The quadrature hybrid 402 may be designed to operate in a system where the characteristic impedance of the interconnecting transmission lines is 50 ohms. As discussed above, the quadrature hybrid 402 may be designed to divide signal power equally at the output ports, so the medium-width shunt transmission line sections corresponding to hybrid's inputs 304, 306 and outputs 412, 414 may be designed to have approximately 50 ohm impedance. A wide-series transmission line section 502 may have approximately 35 ohm impedance. The wide-series transmission line section 502 may have a substantially ring-shaped geometry as shown in FIG. 5. It is noted that while the quadrature hybrid 402 is shown to have conventional ring shaped transmission lines, in various embodiments of the present invention other types of quadrature hybrids may be utilized, such as, for example, but not limited to coupled-line type of quadrature hybrid, broad-band hybrid, Lange hybrid and the like. Narrower transmission line sections forming the first 406 and second 408 splitters and the Wilkinson-type power combiner 410 may have impedance equal to approximately 70 ohms. In addition to shown elements, the phase angle measurement circuit 302 may include a resistor (not shown in FIG. 5), which may have an impedance equal to approximately 100 ohms. The resistor may be placed across a narrow gap 504 between the inputs 416 and 418 of the Wilkinson-type power combiner 410. In some embodiments, the first and second splitters 406 and 408, respectively, and Wilkinson-type power combiner 410 may be implemented as magic tee hybrids. In alternate embodiments, the quadrature hybrid 402, first and second splitters 406 and 408, and Wilkinson-type power combiner 410 can be lumped element components.

With reference back to FIG. 6, the illustrated DOA determination system 600 may include, for example, but not limited to, at least two circularly-polarized antennas 202 and 204 having substantially helical geometry, as shown in FIG. 6. The pair of antennas 202, 204 may be connected to the phase angle measurement circuit 302, as shown in FIG. 6. According to an embodiment of the present invention, the three outputs 308, 310, 312 of the phase angle measurement circuit 302 may be connected to the mobile measuring device 602 via, for example, corresponding SMA connectors 604. The mobile measuring device 602 may be configured to measure signal power of the three output signals 308, 310, 312 generated by the phase angle measurement circuit 302. In an embodiment of the present invention, the mobile measuring device 602 may include a plurality of power meters capable of measuring and storing the amplitudes of the output signals 308, 310 and 312 generated by the phase angle measurement circuit 302. In addition to the components described above, the DOA determination system 600 may include computer system 100 (shown in FIG. 1) consisting of one or more computers, such as server computer 106, linked via network 102. According to an embodiment of the present invention, DOA analyzer program 130, executing at least partly on the server computer 106 may be configured to receive the measurements obtained by the mobile measuring device 602, compute the DOA angle, and transmit the calculated results to one or more client computers 118, 120. The client computers 118, 120 may present the calculated results to a user, using, for example, UI 126, 128.

Referring back to FIG. 2, when the first antenna 202 and second antenna 204 receive a radio signal with a radian frequency $\omega$, they will generate first input signal ($V_1$) 304 and second input signal ($V_2$) 306 of the same frequency. Assuming the received radio signal is a narrowband signal (such as a WLAN signal) the input signals 304 and 306 can be represented as cosine waves:

$$V_1 = |V_1|\cos(\omega t + \alpha)$$

$$V_2 = |V_2|\cos(\omega t) \tag{5}$$

wherein $V_2$ is the phase reference signal and wherein input signals $V_1$ 304 and $V_2$ 306 have the same or different amplitudes.

As discussed above in conjunction with FIG. 4, according to one embodiment of the present invention, the first output signal 412 of the quadrature hybrid 402 may represent a sum of the first input signal 304 phase shifted by 90 degrees and the second input signal 306 phase shifted by 180 degrees. As further discussed above, first splitter 406 produces first output signal ($V_3$) 308 of the phase angle measurement circuit 302 that duplicates the first output signal 412 of the quadrature hybrid 402. Accordingly, the first output signal 308 of the phase angle measurement circuit 302 may be represented by the following equation (6):

$$V_3 = \frac{1}{2}[|V_1|\cos(\omega t + \alpha - 90°) + |V_2|\cos(\omega t - 180°)] \tag{6}$$

By applying some trigonometric identities on equation (6) the following equation (7) in real-imaginary form is provided:

$$V_3 = \frac{1}{2}[(|V_1|\sin\alpha - |V_2|)\cos\omega t + (|V_1|\cos\alpha)\sin\omega t] \tag{7}$$

where the coefficient in front of the cos $\omega t$ part is the real part of first output signal ($V_3$) 308 and the coefficient in front of the sin $\omega t$ part is the imaginary part. Since V represents a magnitude, as understood in the art, power may be calculated as $P=|V|^2/(2R)$, so in the case of determining the average power corresponding to first output signal 308, power is computed by the following equation (8):

$$P_3 = \frac{|V_3|^2}{2R_0} = \frac{\Re^2(V_3) + \Im^2(V_3)}{2R_0} \tag{8}$$

where $R_0$ is the port impedance and $\Re\,(\cdot)$ and $\Im\,(\cdot)$ mean "the real part of" and "the imaginary part of" respectively. Making the substitutions from equation (7) into equation (8), the following equation (9) is provided:

$$P_3 = \frac{1}{8R_0}(|V_1|\sin\alpha - |V_2|)^2 + \frac{1}{8R_0}(|V_1|\cos\alpha)^2 \tag{9}$$

Simplifying yields the final equation (10) for $P_3$:

$$P_3 = \frac{1}{8R_0}[|V_1|^2 + |V_2|^2 - 2|V_1||V_2|\sin\alpha] \tag{10}$$

In a similar manner as described above, one can find the magnitudes ($P_4$ and $P_5$) corresponding to the second output signal ($V_4$) 308 and third output signal ($V_5$) 310 of the phase angle measurement circuit 302, respectively:

$$P_4 = \frac{1}{8R_0}[|V_1|^2 + |V_2|^2 + 2|V_1||V_2|\cos\alpha] \quad (11)$$

$$P_5 = \frac{1}{8R_0}[|V_1|^2 + |V_2|^2 + 2|V_1||V_2|\sin\alpha] \quad (12)$$

Together, equations (10), (11) and (12) form a non-linear system of equations (13):

$$P_3 = \frac{1}{8R_0}[|V_1|^2 + |V_2|^2 - 2|V_1||V_2|\sin\alpha] \quad (13)$$

$$P_4 = \frac{1}{8R_0}[|V_1|^2 + |V_2|^2 + 2|V_1||V_2|\cos\alpha]$$

$$P_5 = \frac{1}{8R_0}[|V_1|^2 + |V_2|^2 + 2|V_1||V_2|\sin\alpha]$$

Advantageously, the non-linear system of equations (13) produces a unique combination of power magnitudes ($P_3$, $P_4$ and $P_5$) for each possible RF phase angle $\alpha$ difference between the two input signals 304 and 306.

Figure 7:
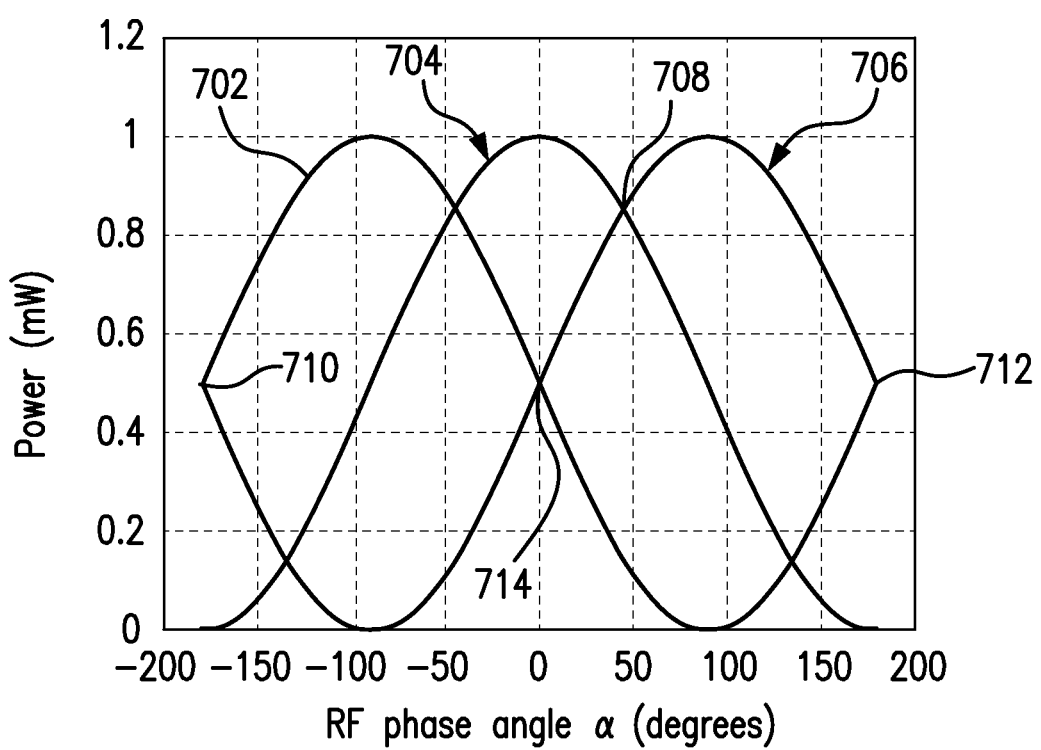
FIG. 7 is a graph illustrating output power measurements versus input phase for equal inputs in accordance with an illustrated embodiment of the present invention.

FIG. 7 illustrates the behavior of the non-linear system of equations (13) as $\alpha$ is varied, for the special case of equal-magnitude input signals 304 and 306. In the graphs shown in FIG. 7 the horizontal axis depicts the value of variable RF phase angle $\alpha$ being varied from −180 degrees to +180 degrees. The vertical axis of the graphs shown in FIG. 7 depicts the value of average power. It is noted that even though the input signals 304 and 306 have the same magnitude, a unique combination of magnitudes ($P_3$ represented by curve 702, $P_4$ represented by curve 704 and $P_5$ represented by curve 706) is produced by the phase angle measurement circuit 302 for each possible RF phase angle $\alpha$. As described below with reference to FIG. 9B, the DOA analyzer program 130 takes advantage of this uniqueness property by reversing the relationship in order to determine RF phase angle $\alpha$ based on the measurements of three characteristic power magnitudes ($P_3$, $P_4$ and $P_5$). In addition, FIG. 7 illustrates the power amplitude crossover points 708, 710, 712, and 714. As discussed below, these power crossover points 708, 710, 712, and 714 occur at the same angle values irrespective of the relative amplitudes of the input signals 304 and 306.

Figure 8:
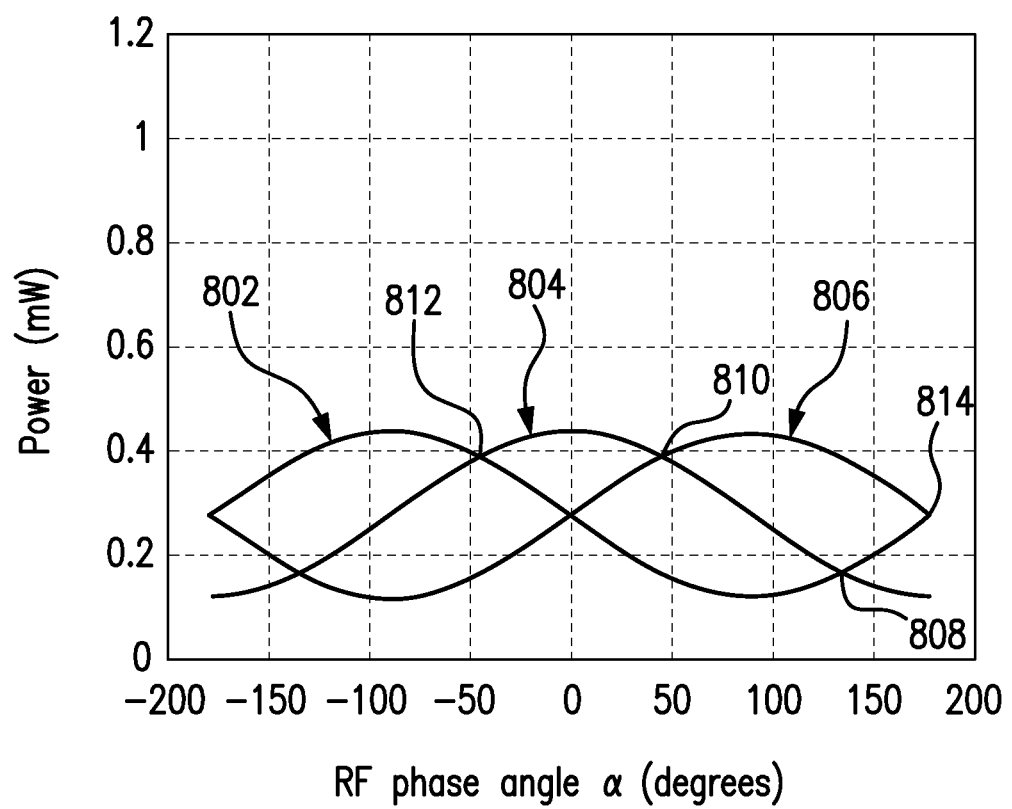
FIG. 8 is a graph illustrating output power measurements versus input phase for unequal inputs in accordance with an illustrated embodiment of the present invention.

FIG. 8 illustrates the behavior of the non-linear system of equations (13) as $\alpha$ is varied, for a different special case where input signals 304 and 306 differ in magnitude. In the illustrative example shown in FIG. 8, one of the input signals, for example first input signal 304, has a power magnitude of approximately 1 milliwatt and the other input signal (second input signal 306) has a power magnitude of approximately 0.1 milliwatt. As illustrated in FIG. 8, when the power magnitudes of the input signals 304 and 306 are not equal, the output power magnitude combinations produced by the phase angle measurement circuit 302 ($P_3$ represented by curve 802, $P_4$ represented by curve 804 and $P_5$ represented by curve 806) are still unique for different input RF phase angles $\alpha$. FIG. 8 also illustrates the power amplitude crossover points 808, 810, 812, and 814 for this special case.

Figure 9A:
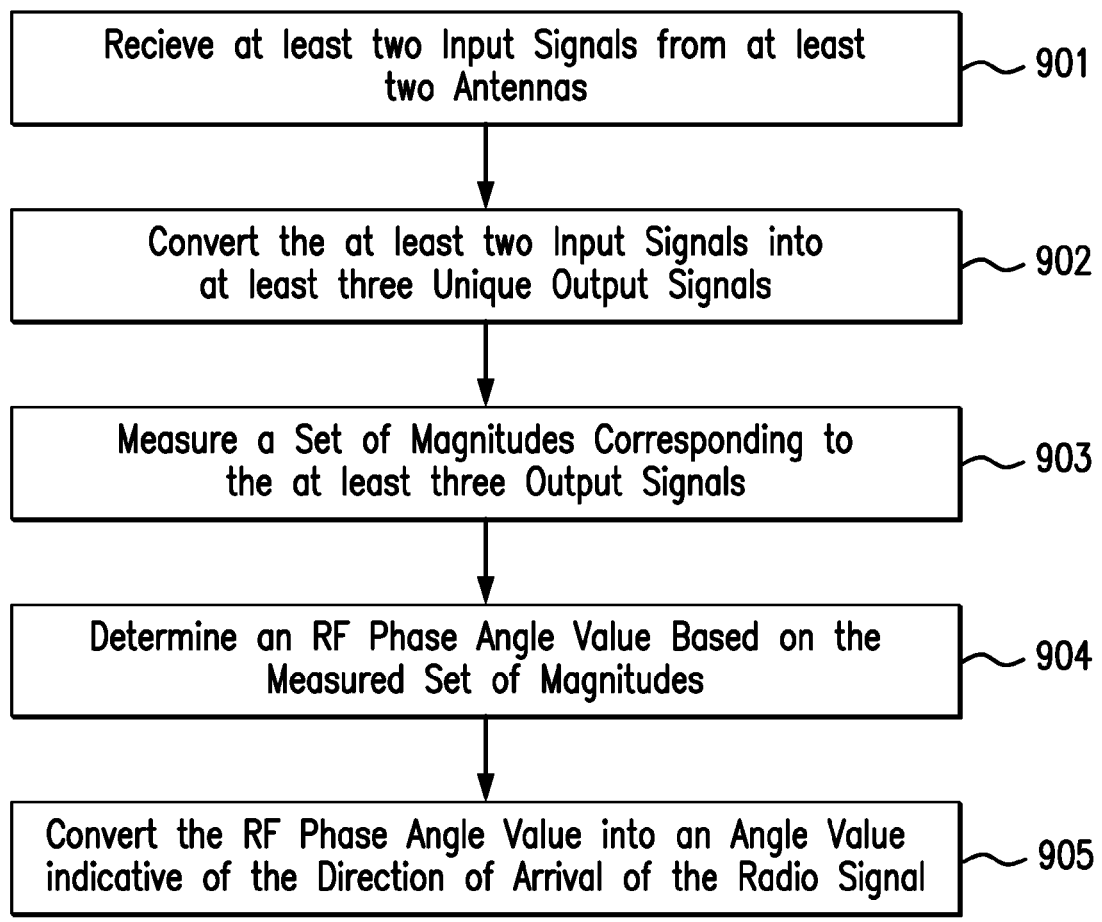
FIG. 9A is a flowchart of operational steps of the system of FIG. 6 to determine the DOA of the radio signal, in accordance with an illustrative embodiment of the present invention.

FIG. 9A is a flowchart of operational steps of the system of FIG. 6 to determine the DOA of the radio signal, in accordance with an illustrative embodiment of the present invention. At step 901, the phase angle measurement circuit 302 receives at least two input signals from at least two separated antennas, such as antennas 202 and 204 depicted in FIG. 6. At step 902, the phase angle measurement circuit 302 converts the received input signals into at least three unique output signals, such as signals 308, 310 and 312 shown in FIG. 3. As described above in conjunction with FIG. 3, the produced set of output signals 308, 310 and 312 comprises a unique combination of magnitudes for each possible RF phase angle difference between the two input signals 304 and 306. At step 903, the mobile measuring device 602 (shown in FIG. 6) measures a set of magnitudes of the three output signals 308, 310 and 312 generated by the phase angle measurement circuit 302. The DOA analyzer program component 130 of the DOA determination system 600 receives the measurements obtained by the mobile measuring device 602 at step 904. Furthermore, at step 904, the DOA analyzer program 130 determines an RF phase angle value based on the measured set of magnitudes, as described below in conjunction with steps 906-909 of FIG. 9B. At step 905, the DOA analyzer program 130 converts the RF phase angle value into an angle value indicative of the direction of arrival of the received radio signal wave, as described below in conjunction with steps 910-912 of FIG. 9B.

Figure 9B:
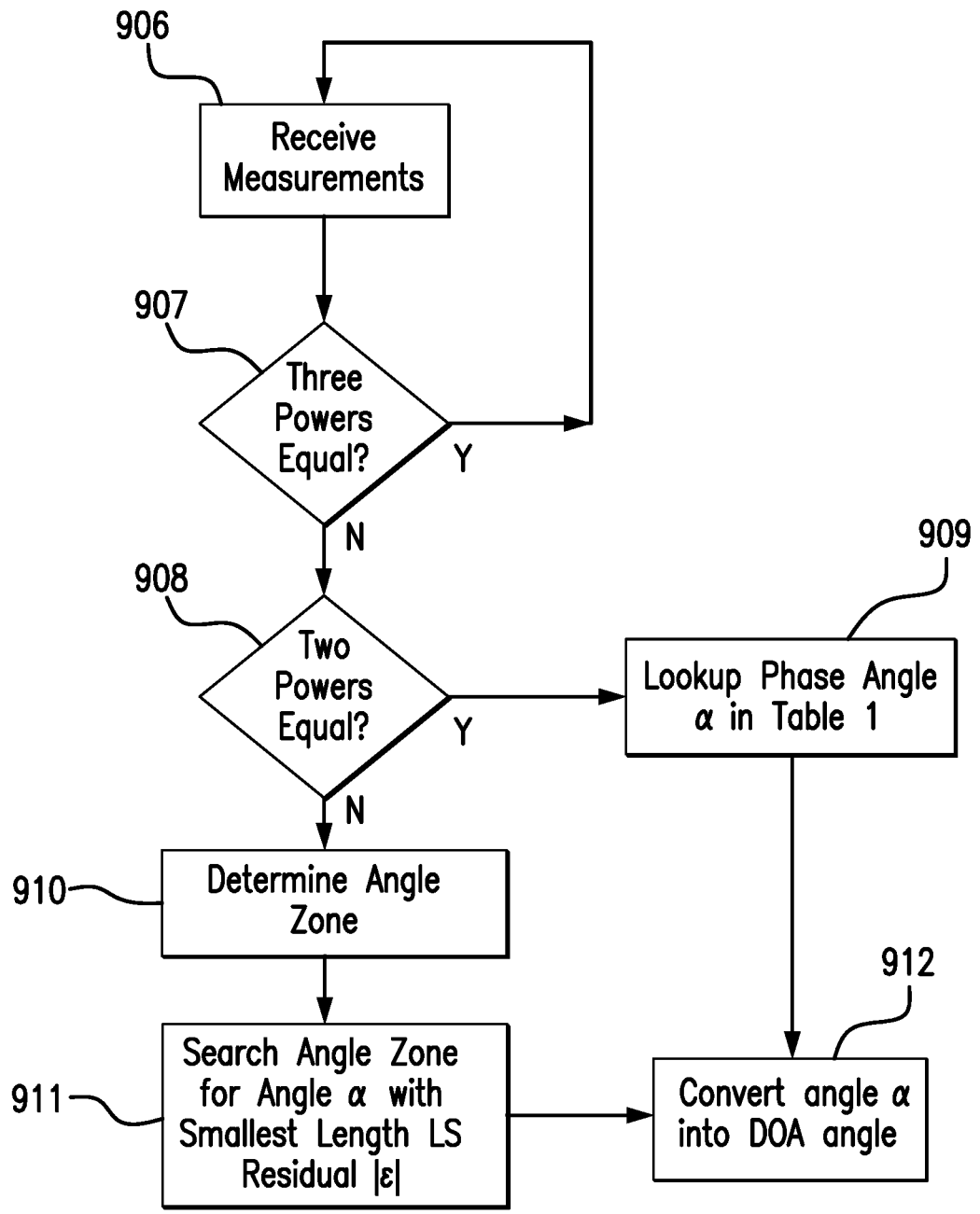
FIG. 9B is a flowchart of operational steps of a DOA analyzer program in accordance with an embodiment of the present invention.

With reference now to FIG. 9B, a flowchart of operational steps of the DOA analyzer program 130, according to an embodiment of the present invention, is shown. DOA analyzer program 130 may be, for example, a computer program or program component for determining the physical location of a source of the received radio signal. DOA analyzer program 130, executing, for example on server computer 106, may comprise program instructions stored on one or more computer-readable storage devices, which may include internal storage 112 on server computer 106. According to an embodiment of the present invention, DOA analyzer program 130 may be configured to receive and process the power amplitude measurements ($P_3$, $P_4$ and $P_5$) obtained by the mobile measurement device 602, as discussed below. The DOA analyzer program 130 may first determine the RF phase angle $\alpha$ based on the received power amplitude measurements ($P_3$, $P_4$ and $P_5$) using the non-linear system of equations (13). Next, the DOA analyzer program 130 may convert the RF phase angle $\alpha$ into an angle indicative of DOA.

Starting at step 906, the DOA analyzer program 130 may receive the power amplitude measurements ($P_3$, $P_4$ and $P_5$) from the mobile measurement device 602 (shown in FIG. 6). If the mobile measurement device 602 produces readings in logarithmic units, at step 906, the DOA analyzer program 130 may convert the power amplitude measurements from logarithmic units to linear units, such as, for example, but not limited to milliwatt (mW).

At step 907, the DOA analyzer program 130 determines whether all three power amplitude measurements received at step 906 are equal. It is noted that while it is physically possible for the three measured power amplitudes to be equal ($P_3 = P_4 = P_5$), mathematically, this occurs when the antennas 202 and 204 produce either the first input signal 304 or the second input signal 306 with an amplitude value equal to zero. As known in the art, the phase of a zero amplitude signal is undefined. Therefore, the phase difference between a zero signal and any other signal is also undefined. This case is expected to be relatively rare in practice because if a radio signal arrives, for example, at first antenna 202 (shown in FIG. 2) typically second antenna 204 will receive at least a part of the same radio signal too. For purposes of clarity, an embodiment of the present invention considers this case negligible, and the DOA analyzer program 130 considers such measurements to be invalid. Accordingly, in response to determining that the three measured power amplitudes are equal (determination block 907, yes branch), the DOA analyzer program 130 may return to step 906 and wait for a valid set of power amplitude measurements.

Next, in response to determining that the three measured power amplitudes are not equal (determination block 907, no branch), the DOA analyzer program 130 may determine, at step 908, whether any two of the received three power amplitude measurements ($P_3$, $P_4$ and $P_5$) are equal. According to an embodiment of the present invention, this determination provides a way to identify the RF phase angle $\alpha$ with minimal computation for the special angles corresponding to the power amplitude crossover points 708, 710, 712, 714 and 808, 810, 812, and 814 (shown in FIGS. 7 and 8, respectively). As discussed below, the power amplitude crossover points 708-714 and 808-814 always occur at the same special angles, regardless of the relative amplitudes of the three power amplitude measurements ($P_3$, $P_4$ and $P_5$).

Figure 10:
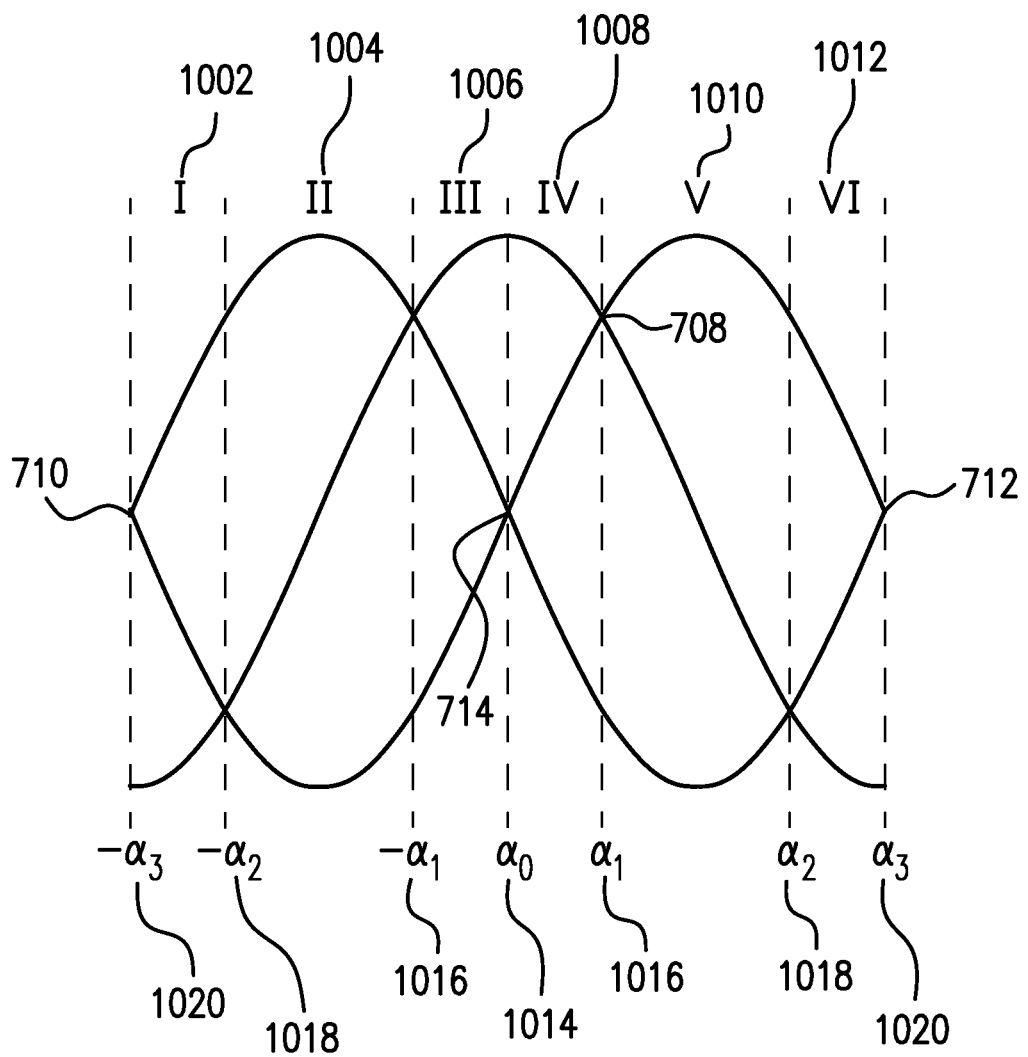
FIG. 10 illustrates special angles and angle zones utilized by the DOA analyzer program in accordance with an illustrated embodiment of the present invention.

With reference now to FIG. 10, the special angles corresponding to the power amplitude crossover points 708-714 are shown. According to an embodiment of the present invention, the special angles may include $\alpha_0$ 1014, $\pm\alpha_1$ 1016, $\pm\alpha_2$ 1018, and $\pm\alpha_3$ 1020.

First special angle $\alpha_0$ 1014 occurs at 0° due to symmetry of the curves representing the measured power magnitudes. For example, as shown in FIG. 7, curve 702 representing power magnitude $P_3$ is symmetrical to curve 706 representing the power magnitude $P_5$, and the crossover point 714 occurs due to this symmetry. Accordingly, in FIG. 10, first special angle $\alpha_0$ 1014 corresponds to the crossover point 714 and may be represented by the following expression (14):

$$\alpha_0 = 0° \quad (14)$$

One may find the other special angles corresponding to the power amplitude crossover points 708-714 and 808-814 as follows. Second special angle $\alpha_1$ 1016 occurs when the power magnitude $P_4$ is equal to the power magnitude $P_5$. This relationship may be represented by the following equation (15):

$$\frac{1}{8R_0}[|V_1|^2 + |V_2|^2 + 2|V_1||V_2|\cos\alpha_1] = \frac{1}{8R_0}[|V_1|^2 + |V_2|^2 + 2|V_1||V_2|\sin\alpha_1] \quad (15)$$

Simplifying yields the following equation (16):

$$\cos\alpha_1 = \sin\alpha_1 \quad (16)$$

Using the well-known trigonometric identity, one may determine the second special angle $\alpha_1$ 1016, which may be represented by the following expression (17):

$$\alpha_1 = 45° \quad (17)$$

One may find third special angle $\alpha_2$ 1018 in a similar manner. More specifically, third special angle $\alpha_2$ 1018 occurs when the power magnitude $P_3$ is equal to the power magnitude $P_4$. This equation may be represented by the following equation (18):

$$\frac{1}{8R_0}[|V_1|^2 + |V_2|^2 + 2|V_1||V_2|\sin\alpha_2] = \frac{1}{8R_0}[|V_1|^2 + |V_2|^2 + 2|V_1||V_2|\cos\alpha_2] \quad (18)$$

Simplifying yields the following equation (19):

$$-\sin\alpha_2 = \cos\alpha_2 \quad (19)$$

Using again a well-known trigonometric identity, one may determine the third special angle $\alpha_2$ 1018, which may be represented by the following expression (20):

$$\alpha_2 = 135° \quad (20)$$

Fourth special angle $\alpha_3$ 1020 occurs at 180° due to symmetry of the curves representing the measured power magnitudes. For example, as shown in FIG. 7, curve 702 representing power magnitude $P_3$ is symmetrical to curve 706 representing the power magnitude $P_5$, and the crossover points 710 and 712 occur due to this symmetry. Accordingly, in FIG. 10, fourth special angle $\pm\alpha_3$ 1020 corresponds to the crossover points 710 and 712 and may be represented by the following expression (21):

$$\alpha_0 = 180° \quad (21)$$

According to an embodiment of the present invention, based on the foregoing description, in some special cases the DOA analyzer program 130 may identify the RF phase angle $\alpha$ by determining if any two of the received power amplitude measurements ($P_3$, $P_4$ and $P_5$) are equal to each other and then determining if the third power amplitude measurement is greater than or less than the equal power amplitude measurements. Table 1 below summarizes how the DOA analyzer program 130 may identify the RF phase angle $\alpha$ in response to determining that two power amplitude measurements are equal:

TABLE 1

| Condition | Phase Angle Result |
|---|---|
| ($P_5$ == $P_4$) < $P_3$ | $\alpha = -\alpha_2$ |
| ($P_3$ == $P_4$) > $P_5$ | $\alpha = -\alpha_1$ |
| ($P_3$ == $P_5$) < $P_4$ | $\alpha = \alpha_0 = 0°$ |
| ($P_4$ == $P_5$) > $P_3$ | $\alpha = \alpha_1$ |
| ($P_3$ == $P_4$) < $P_5$ | $\alpha = \alpha_2$ |
| ($P_3$ == $P_5$) > $P_4$ | $\alpha = \pm\alpha_3 = \pm180°$ |
| $P_3$ == $P_4$ == $P_5$ | phase angle $\alpha$ is undefined. |

With reference back to FIG. 9B, in response to determining that any two of the received three power amplitude measurements are equal (decision block 908, yes branch), at step 909, the DOA analyzer program 130 may determine the RF phase angle $\alpha$ by, for example, examining Table 1 shown above. According to one embodiment of the present invention, Table 1 may be stored in one or more databases 124 of storage unit 122 (shown in FIG. 1). According to an alternative embodiment, Table 1 may be included, as a plurality of conditions, within programming instructions of the DOA analyzer program 130.

According to an embodiment of the present invention, in response to determining that no two of the received three power amplitude measurements are equal (decision block 908, no branch), the DOA analyzer program 130 may calculate the RF phase angle $\alpha$ using a search technique described below in connection with steps 910 and 911.

At step 910, the DOA analyzer program 130 may first reduce a scope of the search by determining an angle zone in which the RF phase angle α of interest may lie in. With reference back to FIG. 10, a plurality of angle zones 1002-1012 is shown, the RF phase angle α is varied from −180 degrees to +180 degrees. According to an embodiment of the present invention, the DOA analyzer program 130 may determine an angle zone by comparing all of the received power amplitude measurements ($P_3$, $P_4$ and $P_5$). Table 2 below summarizes how the DOA analyzer program 130 may identify the angle zone based on the required comparisons:

TABLE 2

| Condition | Angle Zone |
| --- | --- |
| $P_3 > P_5 > P_4$ | I |
| $P_3 > P_4 > P_5$ | II |
| $P_4 > P_3 > P_5$ | III |
| $P_4 > P_5 > P_3$ | IV |
| $P_5 > P_4 > P_3$ | V |
| $P_5 > P_3 > P_4$ | VI |

For example, in response to determining that $P_3>P_5>P_4$, the DOA analyzer program may identify first angle zone 1002, as the angle zone in which the RF phase angle α of interest lies in. Similarly, in response to determining that $P_4>P_3>P_5$, the DOA analyzer program may identify third angle zone 1006, as the angle zone in which the RF phase angle α of interest lies in. According to one embodiment of the present invention, Table 2 may be stored in one or more databases 124 of storage unit 122 (shown in FIG. 1). According to an alternative embodiment, Table 2 may be included, as a plurality of conditional statements, within programming instructions of the DOA analyzer program 130.

With reference back to FIG. 10, it is noted that since the DOA analyzer program 130 may perform calculations for the special angles corresponding to the power amplitude crossover points 708-714 at step 909, described above, those special angles are excluded from the zone they border. For instance, if the second special angle $α_1$ 1016 is equal to 45° and the third special angle $α_2$ 1018 is equal to 135°, then fifth angle zone 1010 may include angles from 46° to 134° inclusively. Similarly, if the second special angle $α_1$ 1016 is equal to 45° and the first special angle $α_0$ 1014 is equal to 0°, then fourth angle zone 1008 may include angles from 1° to 44° inclusively.

At least in some embodiments, the angle zones determined by the DOA analyzer program 130 at step 910 may be used as rough estimates of the RF phase angle α. In other words if a user is simply interested in an approximate physical location of a source of the radio signal received by the pair of antennas 202-204, determining the angle zone as a rough estimate of the RF phase angle α may suffice. In such embodiments, the DOA analyzer program 130 may skip step 911 described below and may go to step 912 after determining the angle zone at step 910. However, in order to deliver more accurate results, at step 911, the DOA analyzer program 130 may search the angle zone identified at step 910 using calculations described below.

For illustrative purposes only assume that a unique combination of power magnitudes ($P_3$, $P_4$ and $P_5$) may be represented by a column vector b (22) as follows:

$$b = \begin{bmatrix} P_3 \\ P_4 \\ P_5 \end{bmatrix} \quad (22)$$

Furthermore, assume that column vector x (23) contains unknown components $x_1$ and $x_2$, as follows:

$$x = \begin{bmatrix} \frac{|V_1|^2 + |V_2|^2}{R_0} \\ \frac{|V_1||V_2|}{R_0} \end{bmatrix} = \begin{bmatrix} x_1 \\ x_2 \end{bmatrix} \quad (23)$$

The matrix of coefficients A (24) may be written as:

$$A = \begin{bmatrix} \frac{1}{8} & -\frac{1}{4}\sin α \\ \frac{1}{8} & +\frac{1}{4}\cos α \\ \frac{1}{8} & +\frac{1}{4}\sin α \end{bmatrix} \quad (24)$$

For a specific RF phase angle α, sin α and cos α can be treated as specific constant values, for example, $k_1$ and $k_2$. Thus, the matrix of coefficients A (24) may be rewritten as follows:

$$A = \begin{bmatrix} \frac{1}{8} & -\frac{1}{4}k_1 \\ \frac{1}{8} & +\frac{1}{4}k_2 \\ \frac{1}{8} & +\frac{1}{4}k_1 \end{bmatrix} \quad (25)$$

Accordingly, the non-linear system of equations (13) may be rewritten using linear algebra notation as a matrix equation (26):

$$Ax=b \quad (26)$$

The matrix equation (26) represents an over-determined set of three linear equations in two unknowns (for a specific RF phase angle α). The two unknowns ($x_1$ and $x_2$) are the components of the column vector x (23).

According to an embodiment of the present invention, the DOA analyzer program 130 may solve the matrix equation (26) by using, for example, standard least square (LS) estimation method. The standard least square estimation method is generally known in the art and is not described herein in detail. According to this method, the LS estimate $\hat{x}$ of x can be represented by the following formula (27):

$$\hat{x}=(A^TA)^{-1}A^Tb \quad (27)$$

where $A^T$ represents the transpose of matrix A.

Further, according to the least square estimation method, a term E representing a residual error may be represented by the following equation (28):

$$\epsilon=A\hat{x}-b=[A(A^TA)^{-1}A^T-I_3]b, \quad (28)$$

where $A^T$ represents the transpose of matrix A and where $I_3$ is the 3×3 identity matrix. The residual error ϵ may also be represented as a three-component vector $\epsilon=[\epsilon_1, \epsilon_2, \epsilon_3]^T$, where $\epsilon_1, \epsilon_2, \epsilon_3$ represent the individual errors between the measured power magnitudes b and corresponding LS-estimated component powers of Ax and where T represents the transpose. For the simplicity of illustration, it is assumed that $\epsilon_1, \epsilon_2, \epsilon_3$ are orthogonal components of vector ϵ. As is known in the art, the magnitude of the vector may be determined by forming the square root of the sum of squares of the orthogonal components. Accordingly, the following equation (29) may be used to calculate the magnitude of the residual vector $\epsilon$:

$$|\epsilon| = \sqrt{\epsilon_1^2 + \epsilon_2^2 + \epsilon_3^2} \quad (29)$$

With reference back to FIG. 9B, at step 911, the DOA analyzer program 130 may find the RF phase angle $\alpha$ by first computing the residual error $\epsilon$ using equation (28) for each angle in a set of candidate angles within the angle zone identified by the DOA analyzer program 130 at step 910. The term "set of candidate angles" as used herein refers to substantially all angles contained within an angle zone spaced apart by a predetermined spacing. For example, according to an embodiment of the present invention, for calculation purposes, the DOA analyzer program 130 may assume that all angles in an angle zone are spaced apart by approximately 1°. Subsequently, the DOA analyzer program 130 may find the RF phase angle $\alpha$ by determining the candidate angle having the smallest magnitude of the residual vector $\epsilon$, using equation (29).

At least in some embodiments of the present invention, the DOA analyzer program 130 may include an optional step of pre-computing and pre-storing the bracketed expression $(A(A^T A)^{-1} A^T - I_3)$ in equation (28) for each candidate angle in each set of candidate angles. It is noted that the aforementioned bracketed expression represents a constant 3×3 matrix for each candidate angle. By pre-computing and pre-storing the bracketed expression, the DOA analyzer program 130 may significantly reduce computation time required to determine the RF phase angle $\alpha$. According to an embodiment of the present invention, the DOA analyzer program 130 may store the pre-computed bracketed expression in one or more databases 124 of storage unit 122.

At step 912, the DOA analyzer program 130 may convert the RF phase angle $\alpha$ into the angle $\phi$ indicative of the direction of arrival of the received radio signal wave. According to an embodiment of the present invention, the DOA analyzer program 130 may utilize formula (4) above to perform the aforementioned conversion.

According to an alternative embodiment of the present invention, the DOA analyzer program 130 may determine the RF phase angle $\alpha$ based on the received power amplitude measurements ($P_3$, $P_4$ and $P_5$) using the equations (30) and (31) shown below:

$$\frac{P_5 - P_3}{2P_4 - (P_3 + P_5)} = \frac{\sin\alpha}{\cos\alpha} = \tan\alpha \quad (30)$$

$$\alpha = \arctan 2\left[\frac{P_5 - P_3}{2P_4 - (P_3 + P_5)}\right] \quad (31)$$

It is noted that while this alternative method of calculating the RF phase angle $\alpha$ is a simplified method, from implementation standpoint, the alternative method may produce less accurate results in some cases. For example, for angles approaching ±90°, the denominator in the bracketed expression ($2P_4 - (P_3 + P_5)$) of formula (31) approaches zero. Thus, a small change in the denominator due to a small error in the power amplitude measurements may produce a significant error in the result determined by the DOA analyzer program 130 using the alternative calculation method.

In summary, illustrated embodiments of the present invention in one aspect generally relate to a system for determining the physical location of a source of a radio signal using a monopulse technique. The system illustrated in FIG. 6 measures the phase difference between signals received by at least two separated antennas and converts this difference into a unique combination of power magnitudes for each possible RF phase angle difference between the two received signals. The system further includes the DOA analyzer program 130 (FIG. 1) for performing DOA determination based on the unique combination of power magnitude measurements. Advantageously, illustrated embodiments of the present invention, generally require measurement of amplitude component only, but not phase. Unlike other phase-comparison monopulse systems known in the art, the system disclosed herein uses three distinct measurement channels on a single angular dimension. This is advantageous because for a given noise level, three distinct channels provide a better noise reduction through averaging as compared to either a two channel or one channel systems. In yet another aspect, illustrated embodiments of the present invention are unaffected by various radio propagation factors, such as, for example, a significant difference in amplitude between the two signals received at the two antennas. Furthermore, the illustrated embodiments contemplate that the DOA determination system 600 may be configured to perform the DOA determination calculations for both modulated and un-modulated signals. For modulated signals, the modulation may be passed on in a linear undistorted fashion. For example, if demodulators are included along with the plurality of power meters within the power measuring device 602, such demodulators may operate on the modulation to produce additional signal information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
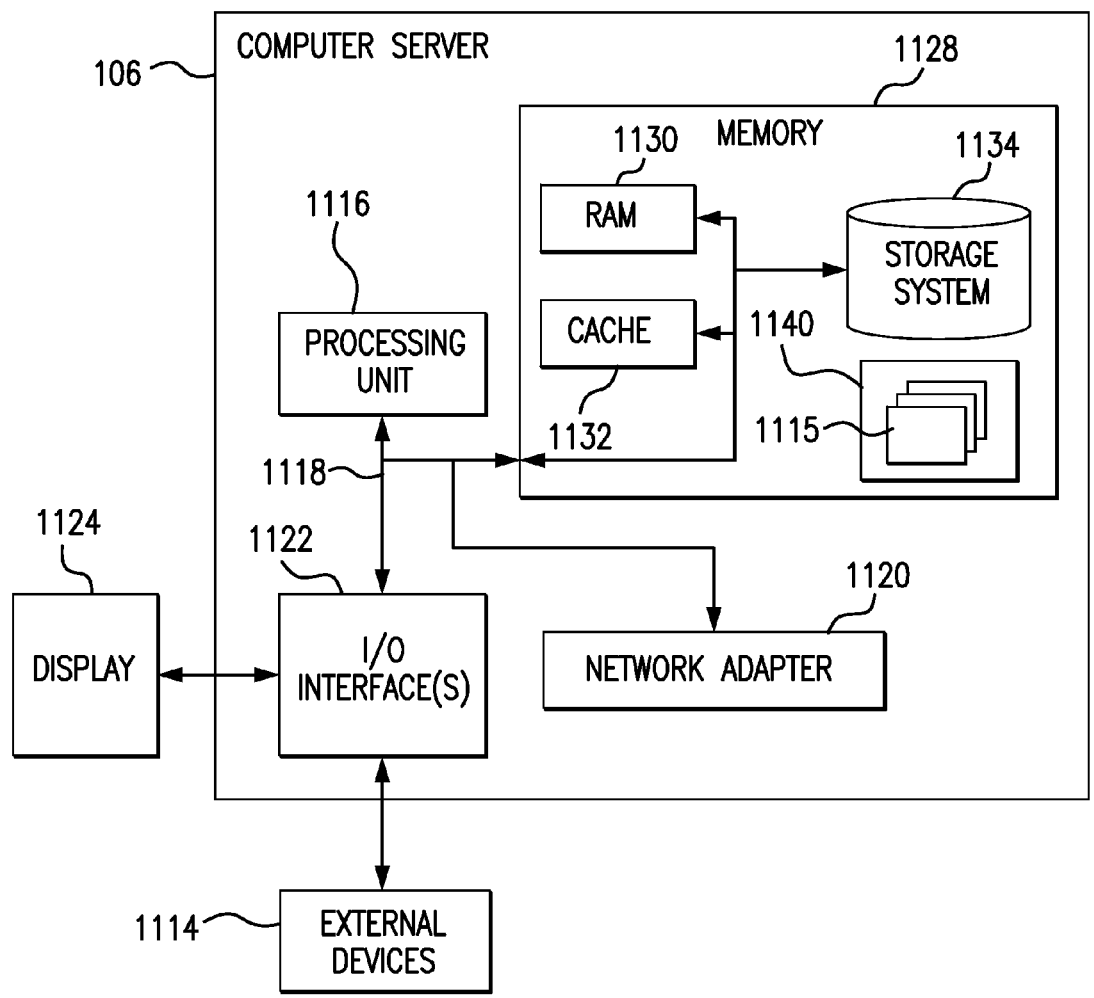
FIG. 11 illustrates internal and external components of the server computer of FIGS. 1 and 6 in accordance with an illustrative embodiment of the present invention.

FIG. 11 illustrates internal and external components of server computer 106 in accordance with an illustrative embodiment. Server 106 is only one example of a suitable server computer and is not intended to suggest any limitation as to the scope of use or functionality of embodiments of the invention described herein. Regardless, server 106 is capable of being implemented and/or performing any of the functionality set forth hereinabove.

Server 106 is operational with numerous other general purpose or special purpose computing system environments or configurations. Examples of well-known computing systems, environments, and/or configurations that may be suitable for use with computer system/server 106 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Server 106 may be described in the general context of computer system-executable instructions, such as program modules, being executed by a computer system. Generally, program modules may include routines, programs, objects, components, logic, data structures, and so on that perform particular tasks or implement particular abstract data types. Server 106 may be practiced in distributed data processing environments where tasks are performed by remote processing devices that are linked through a communications network. In a distributed data processing environment, program modules may be located in both local and remote computer system storage media including memory storage devices.

Server 106 is shown in FIG. 11 in the form of a general-purpose computing device. The components of server 106 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer server 106 typically includes a variety of computer system readable media. Such media may be any available media that is accessible by computer server 106, and it includes both volatile and non-volatile media, removable and non-removable media.

System memory 1128 can include computer system readable media in the form of volatile memory, such as random access memory (RAM) 1130 and/or cache memory 1132. Computer server 106 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1115, such as the DOA analyzer program 130, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1115 generally carry out the functions and/or methodologies of embodiments of the invention as described herein.

Computer server 106 may also communicate with one or more external devices 1114 such as a keyboard, a pointing device, a display 1124, etc.; one or more devices that enable a user to interact with computer server 106; and/or any devices (e.g., network card, modem, etc.) that enable computer server 106 to communicate with one or more other computing devices. Such communication can occur via Input/Output (I/O) interfaces 1122. Still yet, computer server 106 can communicate with one or more networks such as a local area network (LAN), a general wide area network (WAN), and/or a public network (e.g., the Internet) via network adapter 1120. As depicted, network adapter 1120 communicates with the other components of computer server 106 via bus 618. It should be understood that although not shown, other hardware and/or software components could be used in conjunction with computer server 106. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining the direction of arrival of a radio signal, the method comprising the steps of:
   receiving, by an electronic circuit, at least two input signals from at least two separated antennas, each input signal characterizing the radio signal having a radio frequency (RF);
   converting, by the electronic circuit, the at least two input signals into at least three output signals, wherein the at least three output signals have a unique combination of corresponding magnitudes for each RF phase difference between the at least two input signals;
   measuring, by a measuring device, a set of magnitudes corresponding to the at least three output signals;
   determining, by a processor, an RF phase angle value based on the measured set of magnitudes; and
   converting, by the processor, the RF phase angle value into an angle value indicative of the direction of arrival of the radio signal, wherein the electronic circuit comprises
   a phase shifting circuit receiving the at least two input signals and generating a first and second output signals;
   a power splitting circuit comprising a first splitter and a second splitter, the first splitter receiving the first output of the phase shifting circuit and generating a first pair of output signals and the second splitter receiving the second output of the phase shifting circuit and generating a second pair of output signals; and
   a power combining circuit receiving one of the first pair of output signals of the power splitting circuit and one of the second pair of output signals of the power splitting circuit, the power combining circuit generating an output signal comprising a sum of the received signals and further wherein
   the phase shifting circuit comprises a quadrature hybrid, wherein the first and second splitters comprise reactive splitters and wherein the power combining circuit comprises a Wilkinson-type power combiner.

2. The method of claim 1, wherein measuring a set of magnitudes comprises measuring a set of amplitudes corresponding to the at least three output signals.

3. The method of claim 1, wherein the radio signal comprises a digitally modulated signal.

4. The method of claim 1, wherein the radio signal comprises an unmodulated signal.

5. The method of claim 1, wherein the phase shifting circuit comprises a quadrature hybrid, wherein the first and second splitters comprise Wilkinson-type splitters and wherein the power combining circuit comprises a Wilkinson-type power combiner.

6. The method of claim 1, wherein determining an RF phase angle value of the radio signal further comprises:
   determining an angle zone in which the RF phase angle lies in, the angle zone comprising a plurality of candidate angles; and
   searching the angle zone by estimating the RF phase angle value via least squares estimation technique based on the measured set of magnitudes.

7. The method of claim 1, wherein determining an RF phase angle value of the radio signal further comprises:
   identifying a plurality of crossover points between a plurality of curves corresponding to each magnitude value included in the measured set of magnitudes; and
   determining the RF phase angle value based on the identified plurality of crossover points.

8. A computer program product for determining the direction of arrival of a radio signal, the computer program product comprising:
one or more computer-readable storage devices and a plurality of program instructions stored on at least one of the one or more computer-readable storage devices, the plurality of program instructions comprising:
program instructions to measure a set of magnitudes corresponding to at least three output signals, wherein the at least three output signals have a unique combination of corresponding magnitudes for each RF phase difference between at least two input signals from at least two separated antennas and wherein the two input signals are converted into the at least three output signals by an electronic circuit;
program instructions to determine an RF phase angle value based on the measured set of magnitudes; and
program instructions to convert the RF phase angle value into an angle value indicative of the direction of arrival of the radio signal, wherein the electronic circuit comprises
a phase shifting circuit receiving the at least two input signals and generating a first and second output signals:
a power splitting circuit comprising a first splitter and a second splitter, the first splitter receiving the first output of the phase shifting circuit and generating a first pair of output signals and the second splitter receiving the second output of the phase shifting circuit and generating a second pair of output signals; and
a power combining circuit receiving one of the first pair of output signals of the power splitting circuit and one of the second pair of output signals of the power splitting circuit, the power combining circuit generating an output signal comprising a sum of the received signals and further wherein
the phase shifting circuit comprises a quadrature hybrid, wherein the first and second splitters comprise reactive splitters and wherein the power combining circuit comprises a Wilkinson-type power combiner.

9. The computer program product of claim 8, wherein the program instructions to measure a set of magnitudes comprise program instructions to measure a set of amplitudes corresponding to the at least three output signals.

10. The computer program product of claim 8, wherein the radio signal comprises a digitally modulated signal.

11. The computer program product of claim 8, wherein the radio signal comprises an unmodulated signal.

12. The computer program product of claim 8, wherein the program instructions to determine an RF phase angle value of the radio signal further comprise:
program instructions to determine an angle zone in which the RF phase angle lies in, the angle zone comprising a plurality of candidate angles; and
program instructions to search the angle zone by estimating the RF phase angle value via least squares estimation technique based on the measured set of magnitudes.

13. The computer program product of claim 8, wherein the program instructions to determine an RF phase angle value of the radio signal further comprise:
program instructions to identify a plurality of crossover points between a plurality of curves corresponding to each magnitude value included in the measured set of magnitudes; and
program instructions to determine the RF phase angle value based on the identified plurality of crossover points.

14. The computer program product of claim 12, wherein the program instructions to determine an angle zone further comprise program instructions to determine whether any two of the measured set of magnitudes are equal to each other.

15. The computer program product of claim 12, wherein the plurality of candidate angles in the angle zone are spaced apart by approximately 1 degree.

* * * * *